(12) United States Patent
Tanaka et al.

(10) Patent No.: US 7,591,501 B2
(45) Date of Patent: Sep. 22, 2009

(54) HATCHBACK DOOR STRUCTURE FOR VEHICLES

(75) Inventors: Takeki Tanaka, Saitama (JP);
Tomofumi Ichinose, Saitama (JP);
Kazuhiko Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 11/715,690

(22) Filed: Mar. 8, 2007

(65) Prior Publication Data

US 2007/0210613 A1    Sep. 13, 2007

(30) Foreign Application Priority Data

Mar. 9, 2006    (JP) .............................. 2006-064839

(51) Int. Cl.
*B60J 5/10* (2006.01)
(52) U.S. Cl. .................................. 296/146.6; 296/146.8
(58) Field of Classification Search .............. 296/146.5, 296/146.6, 146.8–146.9, 191, 56, 106; 49/502
See application file for complete search history.

(56) References Cited

U.S. PATENT DOCUMENTS

| | | | | |
|---|---|---|---|---|
| 5,314,228 | A * | 5/1994 | Figge, Sr. ................. | 296/146.6 |
| 6,003,931 | A | 12/1999 | Dancasius et al. | |
| 6,053,562 | A * | 4/2000 | Bednarski ................. | 296/146.5 |
| 6,776,449 | B2 * | 8/2004 | Komatsu et al. .......... | 296/146.5 |
| 6,929,308 | B2 * | 8/2005 | Komatsu et al. .......... | 296/146.5 |
| 7,306,279 | B2 * | 12/2007 | Saitoh ...................... | 296/146.8 |
| 2007/0145768 | A1 * | 6/2007 | Saitoh et al. ............. | 296/146.5 |
| 2007/0145773 | A1 * | 6/2007 | Saitoh ...................... | 296/146.8 |
| 2007/0210613 | A1 * | 9/2007 | Tanaka et al. ............. | 296/146.6 |
| 2008/0030047 | A1 * | 2/2008 | Munenaga et al. ....... | 296/146.6 |

FOREIGN PATENT DOCUMENTS

| | | |
|---|---|---|
| AT | 007 550 U1 | 5/2005 |
| JP | 62-113615 | 5/1987 |
| JP | 64-41424 | 3/1989 |
| JP | 7-40225 | 7/1995 |
| JP | 08-258568 | 10/1996 |
| JP | 10-100684 | 4/1998 |
| JP | 11-514613 | 12/1999 |
| JP | 2000-118445 | 4/2000 |
| WO | WO 9809833 | 12/1998 |

* cited by examiner

*Primary Examiner*—Dennis H Pedder
(74) *Attorney, Agent, or Firm*—Carrier, Blackman & Associates, P.C.; William D. Blackman; Joseph P. Carrier

(57) ABSTRACT

A hatchback door structure for a vehicle includes an inner panel which is arranged on an inner side of the vehicle; and an outer panel which is arranged on an outer side of the vehicle, wherein the inner panel includes a frame which has a shape outlining an outer shape of a hatchback door, wherein a window frame portion on which a window glass is mounted is formed in an upper portion of the frame, and a locking device fixing portion for fixing a locking device is formed on a bottom of the frame. A V-shaped stiffening frame portion is integrally formed with the frame, and extends from both a bottom left corner and a bottom right corner of the window frame to the locking device fixing portion, wherein the V-shaped stiffening frame portion protrudes toward the outer panel from an inner side contour of the frame with respect to the vehicle.

23 Claims, 4 Drawing Sheets

HATCHBACK DOOR STRUCTURE FOR VEHICLES

CROSS REFERENCE TO RELATED APPLICATIONS

This application claims the foreign priority benefit under Title 35, United States Code, §119(a)-(d) of Japanese Patent Application Number 2006-064839, filed on Mar. 9, 2006, the contents of which are hereby incorporated by reference.

BACKGROUND OF THE INVENTION

1. Field of the Invention

The present invention relates to a hatchback door structure for vehicles, which is fitted up on a tailgate of a vehicle.

2. Description of the Related Art

A hatchback door fitted up on a tailgate in a rear part of a vehicle is jointed to the vehicle with a hinge structure in general. An opening-closing motion of the hatchback door is performed by rotating the door about the hinge located at an upper end of the door. This type of the hatchback door is required to increase a rigidity for improving collision fracture strength and for avoiding muffled sounds when a vehicle runs on a punishing road. On the other hand, the hatchback door is required to be light for reducing fuel consumption of a vehicle and for improving easiness of the opening-closing motion of the door. Because of the above reasons, a hatchback door for vehicles has been known, in which a structure of the hatchback door is configured by combining two thin panels of an outer panel and an inner panel which has openings, and the structure is also reinforced by a beam and the like as needed (see Japanese Patent No. 3013921, Japanese Patent Laid-Open Publication Kokai No. H11-514613).

A hatchback door structure has been known, which includes an inner panel in which a lateral beam is integrally formed with a frame so that the lateral beam partitions the frame, which has a shape outlining an outer shape of the hatchback door, into an upper side and a bottom side.

FIG. 5 is a schematic view of an example of a conventional hatchback door structure seen from outside a vehicle. A hatchback door structure 101 of a vehicle V includes an inner panel 106 which is configured with a frame 109 and a lateral beam 118, and has a window glass 107 in an opening 112a which is defined by the frame 109 and the lateral beam 118 on the upper side of the lateral beam 118. In an opening 112b defined by the frame 109 and the lateral beam 118 on the bottom side of the lateral beam 118, a pair of connection reinforcements 100a are disposed. A lower end of each of the connection reinforcements 100a is welded on the frame 109 through a lock reinforcement 100b which is fixed to a bottom center of the frame 109. The connection reinforcements 100a extend in a V-shape to respective upper corners of the opening 112b. In addition, an upper end of each of the connection reinforcements 100a is welded on respective corner reinforcements 100c which are fixed on respective upper corners of the opening 112b. In the hatchback door structure 101, a rigidity of the inner panel 106 is increased by disposing the pair of connection reinforcements 100a in the opening 112b and fixing them to the frame 109.

However, in the aforementioned conventional hatchback door structure 101, the discrete connection reinforcements 100a are welded on the frame 109 and the lateral beam 118. In addition, discrete members of the lock reinforcement 100b and the corner reinforcements 100c are bonded on the frame 109 and the lateral beam 118 for fixing the reinforcements 100a. The hatch back door is required to have a high rigidity for reducing muffled sounds when a vehicle runs on a punishing road, while saving a weight for reducing fuel consumption of the vehicle and for enhancing easiness of an opening-closing motion of the door. In the aforementioned hatchback door structure 101, the rigidity is increased. However, the weight of the hatchback door is also increased. In addition, a manufacturing cost goes up due to increase in man-hours for welding the discrete members.

It is, therefore, an object of the present invention to provide a hatchback door structure which is light and sufficiently rigid, as well as capable of reducing a manufacturing cost.

SUMMARY OF THE INVENTION

According to a first aspect of the present invention, there is provided a hatchback door structure for vehicles which comprises: an inner panel which is arranged on an inner side of a vehicle; and an outer panel which is arranged on an outer side of the vehicle, wherein the inner panel comprises: a frame which has a shape outlining an outer shape of a hatchback door, wherein a window frame on which a window glass is mounted is formed in an upper portion of the frame and a locking device fixing portion for fixing a locking device is formed on a bottom of the frame; and a V-shaped stiffening frame which is integrally formed with the frame and extends from each bottom corner of the window frame to the locking device fixing portion, wherein the V-shaped stiffening frame protrudes to the outer panel from an inner side contour of the frame with respect to a vehicle. In the above invention, a bending rigidity of the hatchback door structure can be increased by the effect of the V-shaped stiffening frame which is formed to be protruded from the inner panel which configures the hatchback door structure.

According to a second aspect of the present invention, there is provided the hatchback door structure for vehicles, wherein the V-shaped stiffening frame is smoothly curved. In the above invention, since a load is not concentrated locally in a part of the V-shaped stiffening frame, a local distortion of the hatchback door structure can be prevented. Accordingly, a rigidity of the hatchback door structure can be increased.

According to a third aspect of the present invention, there is provided the hatchback door structure for vehicles, wherein the V-shaped stiffening frame has an outermost portion which is closest to the outer panel, wherein a cut-and-turned-up portion which is to be jointed to the outer panel is formed in the outermost portion. In the above invention, since a height of the cut-and-turned-up portion which is formed in the V-shaped stiffening frame can be lowered, a press formability of the hatchback door structure can be improved. In addition, a rigidity of the cut-and-turned-up portion can be increased against bending of the hatchback door structure. Accordingly, a rigidity of the hatchback door structure can be improved.

According to a fourth aspect of the present invention, there is provided the hatchback door structure for vehicles, wherein a cross sectional width of a part of the V-shaped stiffening frame from the outermost portion to the locking device fixing portion of the frame in an inside-outside direction of a hatchback door is designed to be smaller than a cross sectional width of a part of the V-shaped stiffening frame from each bottom corner of the window frame to the outermost portion. In the above invention, a weight saving of the hatchback door structure can be achieved by designing a cross sectional width of a part of the V-shaped stiffening frame where a sufficient structural strength can be secured to be small.

According to a fourth aspect of the present invention, there is provided the hatchback door structure for vehicles, wherein a cross sectional width of a part from the top portion to the locking device fixing portion of the V-shaped stiffening frame in an inside-outside direction of a hatchback door is designed to be smaller than a cross sectional width of a part from the each bottom corner of the window frame to the top portion. In the above invention, a weight saving of the hatchback door structure can be achieved by designing a cross sectional width of a part where a sufficient structural strength can be secured to be small.

In a hatchback door structure for vehicles according to the present invention, a rigidity of a hatchback door can effectively be enhanced, without increasing a weight of the hatchback door for vehicles and without adding any other members.

DETAILED DESCRIPTION OF THE PREFERRED EMBODIMENT

Embodiment

Hereinafter, a preferred embodiment according to the present invention will be explained by referring to drawings. First, a configuration of the embodiment will be explained.

Figure 1:
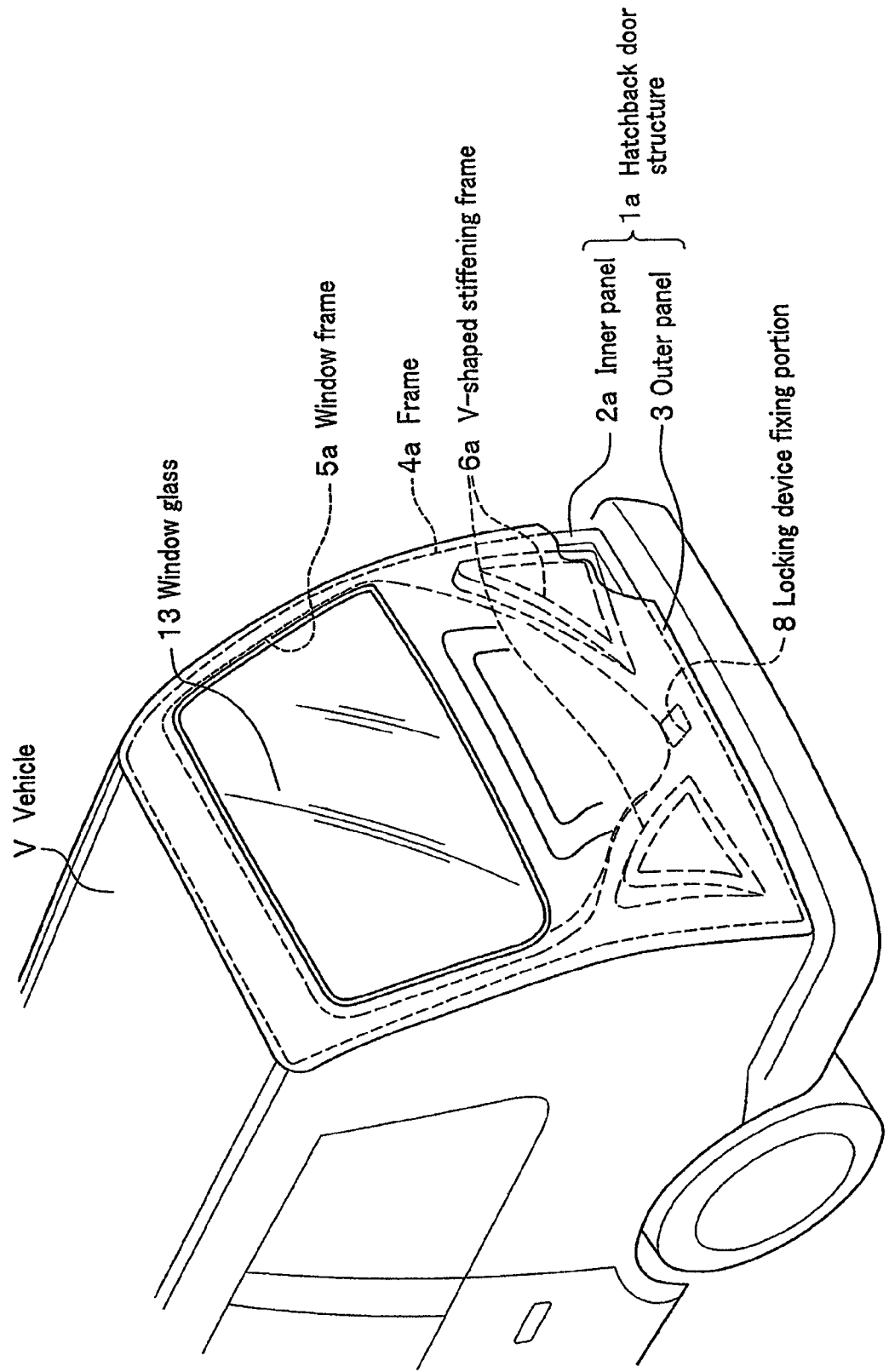
FIG. 1 is an illustration of a vehicle, seen from a backside of the vehicle, which is equipped with a hatchback door structure according to an embodiment of the present invention.

FIG. 1 is an illustration of a vehicle, seen from a backside of the vehicle, which is equipped with a hatchback door structure according to the embodiment. A hatchback door structure 1a for vehicles according to the embodiment has a structure which combines an outer panel 3 which is located outside a vehicle and an inner panel 2a located inside the vehicle. The inner panel 2a has a frame 4a which outlines an outer shape of a hatchback door. In an upper portion of the frame 4a, a window frame 5a in which a window glass 13 is fitted is formed. On a bottom portion of the frame 4a, a locking device fixing portion 8 for fixing a locking device is formed. In addition, a V-shaped stiffening frame 6a is formed, which is integrally formed as part of the frame 4a. The V-shaped stiffening frame 6a extends from both a bottom left corner and a bottom right corner of the window frame 5a, respectively, to the locking device fixing portion 8.

Figure 2A:
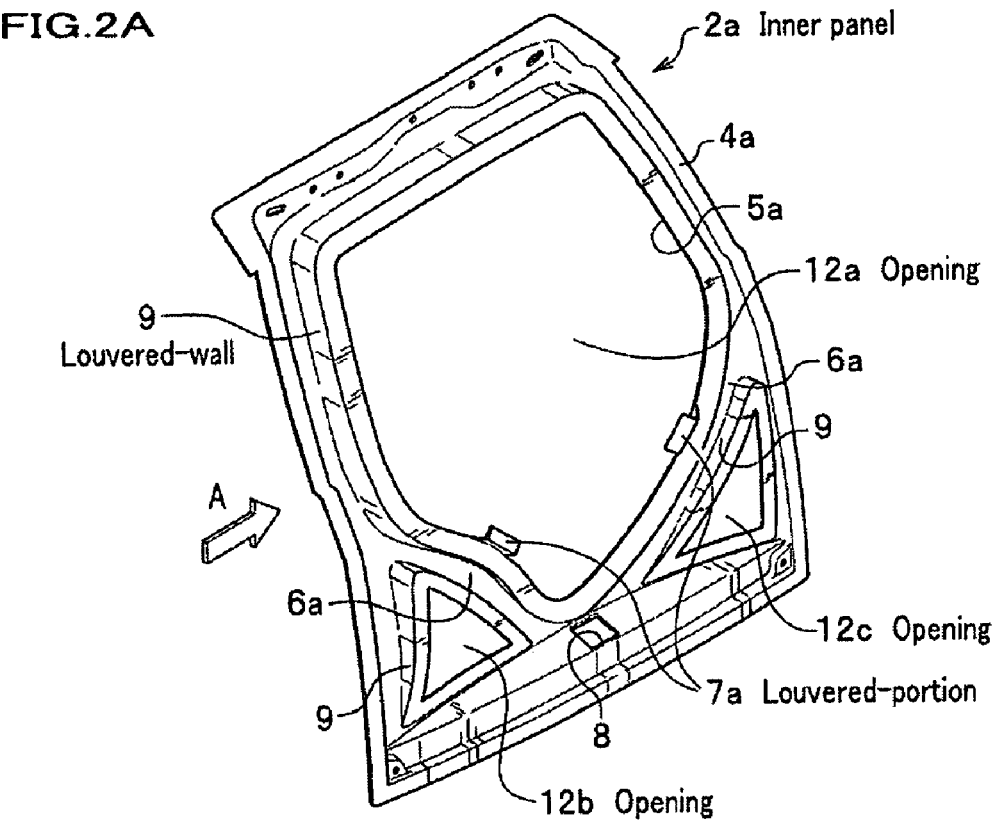
FIG. 2A is a perspective view of an inner panel configuring a hatchback door structure according to the embodiment.
Figure 2B:
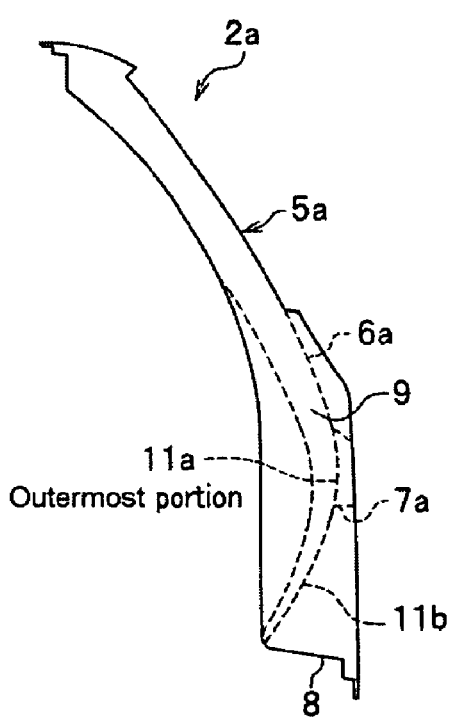
FIG. 2B is an illustration of the inner panel, seen from an "A" arrow direction in FIG. 2A, configuring a hatchback door structure according to the embodiment.

FIG. 2A is a perspective view of an inner panel configuring a hatchback door structure according to the embodiment. FIG. 2B is an illustration of the inner panel, seen from an "A" arrow direction in FIG. 2A, configuring a hatchback door structure according to the embodiment. The inner panel 2a includes the frame 4a, including the window frame 5a, the locking device fixing portion 8, and the pair of integrally formed reinforcement members which constitute the V-shaped stiffening frame 6a. An opening 12a which has approximately a pentagonal shape is formed by the window frame 5a and the V-shaped stiffening frame 6a. In addition, openings 12b, 12c are also formed by the frame 4a and the V-shaped stiffening frame 6a. The openings 12a, 12b, and 12c are formed for saving a weight of the inner panel 2a. In addition, on an outer periphery of the openings 12a, 12b, and 12c, cut-and-turned-up walls (hereinafter, referred to as louvered-walls) are formed. The louvered walls have an effect to increase a bending rigidity (Elastic Constant X Second Moment of Area) of the inner panel 2a.

As shown in FIG. 2B, the V-shaped stiffening frame 6a has a smoothly curved shape of which curvature is smoothly changed if it is seen from a side. Because of the smoothly curved shape, it is hard to cause a local distortion due to a partial load concentration in the V-shaped stiffening frame 6a.

The V-shaped stiffening frame 6a protrudes from an inner side contour of the frame 4a toward the outer panel 3, and becomes closest to the outer panel 3 at an outermost portion 11a (see FIG. 2B). In addition, heights of the louvered-walls 9 of the V-shaped stiffening frame 6a gradually decrease from the outermost portion 11a to the locking device fixing portion 8. Therefore, a cross section of a stiffening frame portion 11b between the outermost portion 11a of the V-shaped stiffening frame 6a and the locking device fixing portion 8 is smaller than a cross section of the V-shaped stiffening frame 6a between the each bottom corner of the window frame 5a and the outermost portion 11a. The reason for making the cross section of the V-shaped stiffening frame 6a smaller in a lower portion of the outermost portion 11a is for saving a weight of the hatchback door structure by designing a cross section of a lower portion of the inner panel 2a to be small, in which a sufficient structural strength can be secured.

A cut-and-turned-up portion (hereinafter, referred to as louvered-portion) 7a is formed at the outermost portion 11a at which the V-shaped stiffening frame 6a becomes closest to the outer panel 3. The louvered-portion 7a is a part to be bonded to the outer panel 3. The outer panel 3 is directly supported by the louvered-portion 7a.

The inner panel 2a according to the embodiment shown in FIG. 2A and FIG. 2B is formed by press-forming. The outermost portion 11a of the V-shaped stiffening frame 6a protrudes toward the outer panel 3. However, since a shape of the V-shaped stiffening frame 6a is smoothly curved, the press-forming of the inner panel 2a can be performed without any difficulty. The inner panel 2a is assembled into the outer panel 3 by a hemming process or a spot-welding or the like to build the hatchback door 1a.

Next, effects and advantages of the embodiment will be explained.

In the embodiment, as described above, the V-shaped stiffening frame 6a protrudes toward the outer panel 3. Here, a comparative inner panel 2d in which the V-shaped stiffening frame 6a is not protruded to the outer panel 3, will be compared with the inner panel 2a which is used for the hatchback door structure 1a according to the embodiment.

Figure 2C:
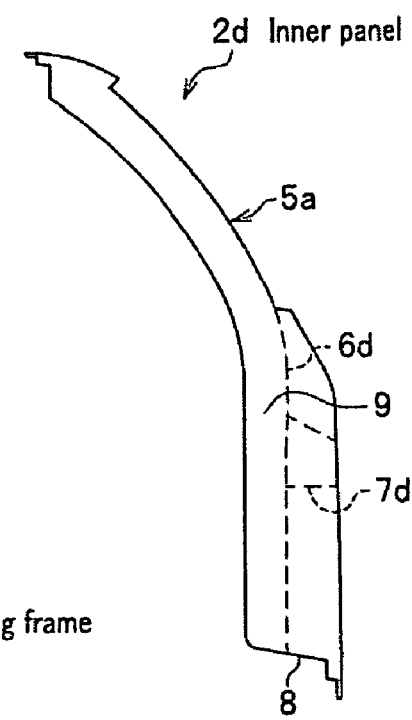
FIG. 2C is an illustration of an inner panel, seen from the "A" arrow direction in FIG. 2A, configuring a hatchback door structure according to the embodiment, in which a V-shaped stiffening frame 6a is not protruded to an outer panel 3 in FIG. 2A and FIG. 2B.

FIG. 2C is a comparative example showing an inner panel, seen from the "A" arrow direction in FIG. 2A, in which the V-shaped stiffening frame 6a is not protruded to the outer panel 3 in the inner panel 2a in FIG. 2A and FIG. 2B. In this case, a V-shaped stiffening frame 6d of the inner panel 2d is formed along an inner side contour of the frame 4a. On the other hand, the V-shaped stiffening frame 6a of the inner panel 2a according to the embodiment shown in FIG. 2A and FIG. 2B is formed with an outwardly bowed arcuate shape as seen from the side, so that the outermost portion 11a protrudes three-dimensionally outwardly toward the outer panel 3 from the inner side contour of the frame 4a. Because of the above configuration in which the outermost portion 11a protrudes three-dimensionally outwardly toward the outer panel 3 from the inner side contour of the frame 4a, a length of the V-shaped stiffening frame 6a becomes longer than that of the inner side contour of the frame 4a. As a result, the V-shaped stiffening frame 6a works as a support against a bending force applied to the inner panel 2a when the hatchback door is closed. Accordingly, a bending rigidity of the hatchback door structure 1a can be increased when the door is closed.

In addition, in a case of the inner panel 2d of FIG. 2C, a distance between the outer panel 3 and the V-shaped stiffening frame 6d becomes longer, compared with the inner panel 2a which is used in the embodiment shown in FIG. 2A and FIG. 2B. Therefore, a height of the louvered-portion 7d with respect to a direction to the outer panel 3 is higher than that of the louvered-portion 7a of the inner panel 2a to be used in the embodiment. Accordingly, a bending rigidity of the louvered-portion 7d is smaller than that of the louvered-portion 7a of the inner panel 2a according to the embodiment.

In addition, the louvered-portion 7a which is formed on the V-shaped stiffening frame 6a is integrally formed with the inner panel 2a by press forming. Since the height of the louvered-portion 7a is lower than that of the louvered-portion 7d, a press formability of the louvered-portion 7a is excellent.

Due to effects of the three-dimensional shape and the relative low height of the louvered-portion 7a of the V-shaped stiffening frame 6a of the inner panel 2a which is used in the embodiment described above, a bending rigidity of the hatchback door structure 1a according to the embodiment which uses the inner panel 2a is increased. A higher bending rigidity of the hatchback door structure 1a results in improving collision strength and avoiding muffled sounds when a vehicle runs a punishing road, in addition to reducing vibrations of the hatchback door when the door is closed.

Figure 5:
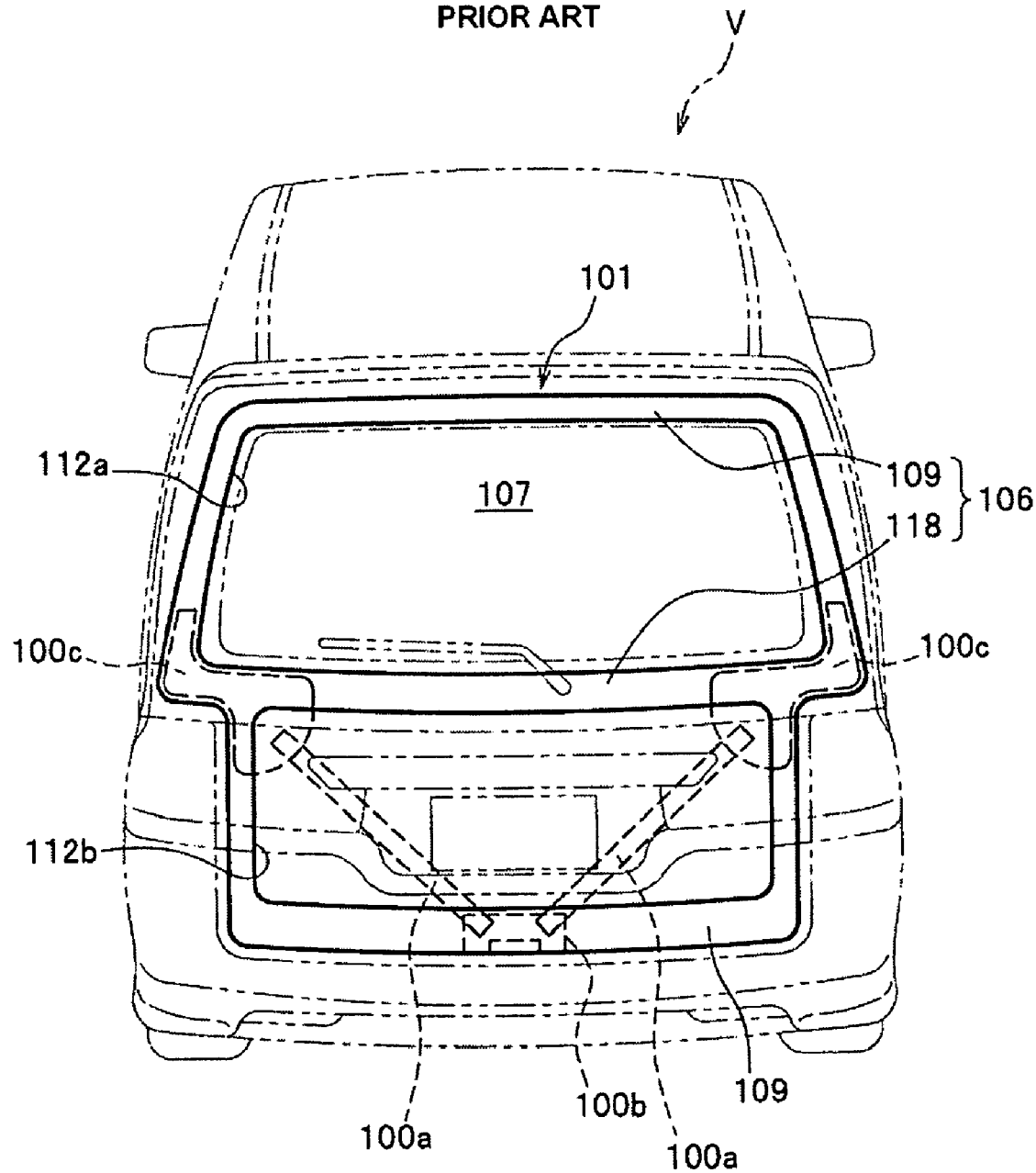
FIG. 5 is a schematic view of an example of a conventional hatchback door structure seen from a backside of a vehicle.

Further, in the hatchback door structure 1a according to the embodiment, the aforementioned increase in the bending rigidity is achieved without adding any new members. Therefore, the hatchback door structure 1a according to the embodiment also has an advantage of decreasing the hatchback door weight. The weight decrease of the hatchback door is achieved by the openings 12b, 12c as well, which are formed on the inner panel 2a. In addition, since the V-shaped stiffening frame 6a is integrally formed by press-punching, a manufacturing process of the inner panel 2a becomes short, compared with that of the conventional inner panel 106 shown in FIG. 5. In addition, since no new member is added, the aforementioned hatchback door structure 1a, which has a high bending rigidity, can be manufactured at a relatively low cost.

As described above, the hatchback door structure 1a according to the embodiment can effectively increase a rigidity of a hatchback door for vehicles without increasing a weight of the hatchback door at relatively low cost.

The present invention is not limited to the embodiment shown in FIG. 2A and FIG. 2B. Various modifications may be possible without departing from the sprits of the present invention. For example, the following inner panel may be used in the embodiment.

Figure 3:
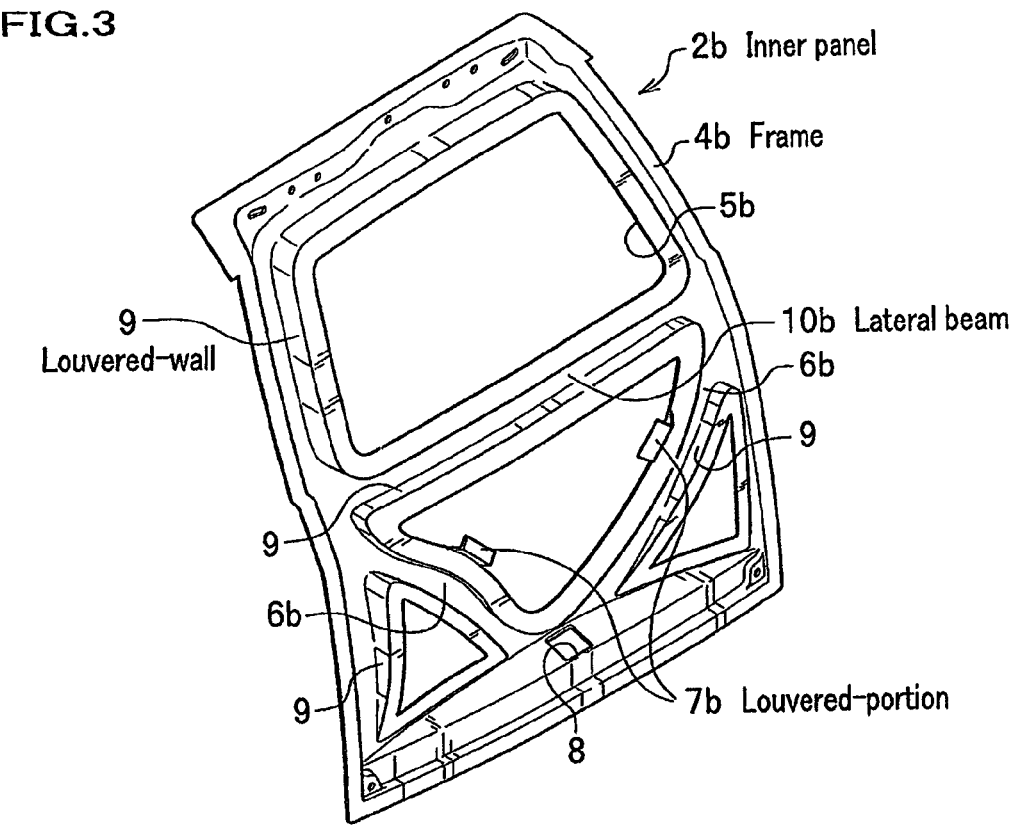
FIG. 3 is a perspective view showing an inner panel to be used in the embodiment, which has an integrally formed lateral beam on a bottom of a window frame.
Figure 4:
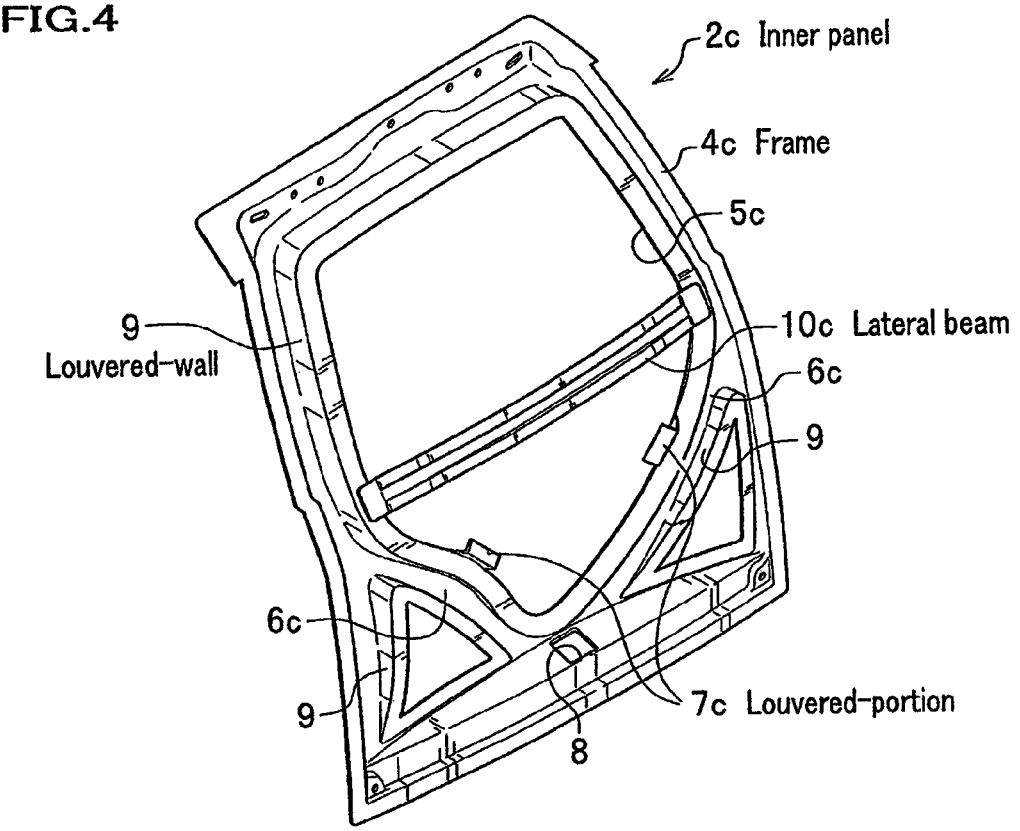
FIG. 4 is a perspective view showing an inner panel to be used in the embodiment, which has a discrete lateral beam on a bottom of a window frame.

FIG. 3 is a perspective view showing an inner panel, which is used in the embodiment, in which a lateral beam is integrally formed on a bottom of a window frame. On the other hand, FIG. 4 is a perspective view showing an inner panel, which is used in the embodiment, in which a discrete lateral beam is formed on the bottom of the window frame. The inner panels 2b, 2c shown in FIG. 3 and FIG. 4 are identical to the inner panel 2a except adding of the lateral beams 10b, 10c, respectively.

Effects of each of the inner panels 2b, 2c are identical to that of the inner panel 2a. On the other hand, since the lateral beam 10b or the lateral beam 10c is added to each of the inner panels 2b, 2c, a bending rigidity of each of the inner panels 2b, 2c is further improved than that of the inner panel 2a. Especially, a press formability of a frame 4c of the inner panel 2c shown in FIG. 4 is excellent compared with that of a frame 4b of the inner panel 2b, in which the lateral beam 10b is integrally formed. Therefore, the louvered walls 9 of the inner panel 2c (see FIG. 4) can be made higher than that of the inner panel 2b (see FIG. 3). Accordingly, a rigidity of a hatchback door structure which uses the inner panel 2c can be made higher than that of a hatchback door structure using the inner panel 2b.

What is claimed is:

1. A hatchback door structure for a vehicle, said hatchback door structure comprising:
    an inner panel which is arranged on an inner side of the vehicle; and
    an outer panel which is arranged on an outer side of the vehicle;
    wherein the inner panel comprises a one-piece press-formed frame which has a shape outlining an outer shape of a hatchback door, the frame comprising:
        a window frame portion on which a window glass is mounted, the window frame portion being formed in an upper portion of the frame;
        a locking device fixing portion for supportively receiving a locking device therein, the locking device fixing portion being formed in a bottom portion of the frame; and
        a V-shaped stiffening frame portion which is integrally formed as part of the frame and extends downwardly from both a bottom left corner and a bottom right corner of the window frame portion to the locking device fixing portion,
        wherein the V-shaped stiffening frame portion protrudes toward the outer panel from an inner side contour of the frame with respect to the vehicle, the V-shaped stiffening frame portion configured with an outwardly bowed arcuate shape as seen from a side view.

2. The hatchback door structure for a vehicle according to claim 1,
    wherein the V-shaped stiffening frame portion is smoothly curved.

3. The hatchback door structure for a vehicle according to claim 1,
    wherein the V-shaped stiffening frame portion has an outermost portion which is closest to the outer panel, wherein a cut-and-turned-up portion which is to be jointed to the outer panel is formed on the outermost portion of the V-shaped stiffening frame portion.

4. The hatchback door structure for a vehicle according to claim 2,
    wherein the V-shaped stiffening frame portion has an outermost portion which is closest to the outer panel, wherein a cut-and-turned-up portion which is to be jointed to the outer panel is formed on the outermost portion of the V-shaped stiffening frame portion.

5. The hatchback door structure for a vehicle according to claim 3, wherein a cross sectional width of a first part of the V-shaped stiffening frame portion extending from the outermost portion to the locking device fixing portion in an inside-outside direction of a hatchback door, is designed to be smaller than a cross sectional width of a second part of the V-shaped stiffening frame portion extending from both the bottom left corner and the bottom right corner of the window frame portion to the outermost portion; and wherein the cross-sectional width of the first part of the V-shaped stiffening frame portion is tapered to gradually decrease from the outermost portion to the locking device fixing portion.

6. The hatchback door structure for a vehicle according to claim 4, wherein a cross sectional width of a first part of the V-shaped stiffening frame portion extending from the outermost portion to the locking device fixing portion in an inside-outside direction of a hatchback door is designed to be smaller than a cross sectional width of a second part of the V-shaped stiffening frame portion extending from both the bottom left corner and the bottom right corner of the window frame portion to the outermost portion; and wherein the cross-sectional width of the first part of the V-shaped stiffening frame portion is tapered to gradually decrease as it extends downwardly from the outermost portion to the locking device fixing portion.

7. The hatchback door structure for a vehicle according to claim 5, wherein a lateral beam is integrally formed on a bottom of the window frame portion, the lateral beam extending from a left side to a right side of the window frame portion.

8. The hatchback door structure for a vehicle according to claim 6, wherein a discrete lateral beam is formed on a bottom of the window frame portion, the lateral beam extending from a left side to a right side of the window frame portion.

9. A hatchback door structure for a vehicle, said hatchback door structure comprising:

an outer panel which is arranged on an outer side of the vehicle; and an inner panel which is arranged on an inner side of the outer panel, the inner panel comprising a one-piece press-formed frame which has a shape outlining an outer shape of a hatchback door, the frame comprising:

a window frame portion for supportively receiving a window glass therein, the window frame portion formed as an upper portion of the frame;

a locking device fixing portion for supportively receiving a locking device therein, the locking device fixing portion formed as part of a bottom portion of the frame; and a V-shaped stiffening frame portion which is integrally formed as part of the frame and which extends from both a bottom left corner and a bottom right corner of the window frame to the locking device fixing portion;

wherein a first substantially triangular opening is formed in a bottom left corner portion of the frame, and a second substantially triangular opening is formed in a bottom right corner portion of the frame, and wherein the V-shaped stiffening frame portion is configured with an outwardly bowed arcuate shape as seen from a side view.

10. The hatchback door structure for a vehicle according to claim 9, wherein the V-shaped stiffening frame portion has an outwardly extended portion which is closest to the outer panel, wherein a cut-and-turned-up portion which is to be joined to the outer panel is formed on the outwardly extended portion.

11. The hatchback door structure for a vehicle according to claim 10, wherein a cross sectional width of a part of the V-shaped stiffening frame portion from the outermost portion to the locking device fixing portion in an inside-outside direction of a hatchback door is designed to be smaller than a cross sectional width of a part of the V-shaped stiffening frame portion from both the bottom left corner and the bottom right corner of the window frame to the outermost portion.

12. The hatchback door structure for a vehicle according to claim 9, wherein a discrete lateral beam is formed on a bottom of the window frame portion, the lateral beam extending from a left side to a right side of the window frame portion.

13. A hatchback door structure for a vehicle, said hatchback door structure comprising:

an inner panel which is arranged on an inner side of the vehicle, said inner panel being formed as an integral unitary member by press-forming; and an outer panel which is arranged on an outer side of the vehicle;

wherein the inner panel comprises:

a frame member which has a shape outlining an outer shape of the hatchback door structure, a locking device fixing portion for supportively receiving a locking device therein, the locking device fixing portion being formed in a bottom portion of the frame member;

a window frame portion on which a window glass is mounted, the window frame portion being formed in an upper portion of the frame member; and a V-shaped stiffening frame portion which is integrally formed as part of the frame member and extends downwardly from both a bottom left corner and a bottom right corner of the window frame portion to the locking device fixing portion, wherein on an upper side of the V-shaped stiffening frame portion, a substantially pentagonal first opening is defined by the V-shaped stiffening frame portion and the frame member; and wherein the V-shaped stiffening frame portion protrudes toward the outer panel from an inner side contour of the frame with respect to the vehicle, the V-shaped stiffening frame portion configured with an outwardly bowed arcuate shape, when viewed in a side view.

14. The hatchback door structure for a vehicle according to claim 13, wherein the V-shaped stiffening frame portion has an outermost portion which is closest to the outer panel, wherein a cut-and-turned-up portion which is to be jointed to the outer panel is formed on the outermost portion of the V-shaped stiffening frame portion;

wherein a cross sectional width of a first part of the V-shaped stiffening frame portion extending from the outermost portion to the locking device fixing portion in an inside-outside direction of a hatchback door, is less than a cross sectional width of a second part of the V-shaped stiffening frame portion extending from both the bottom left corner and the bottom right corner of the window frame portion to the outermost portion; and wherein the cross-sectional width of the first part of the V-shaped stiffening frame portion is tapered to gradually decrease from the outermost portion to the locking device fixing portion.

15. A hatchback door structure for a vehicle, said hatchback door structure comprising:
   an inner panel which is arranged on an inner side of the vehicle; and
   an outer panel which is arranged on an outer side of the vehicle;
   wherein the inner panel comprises a one-piece press-formed frame which has a shape outlining an outer shape of a hatchback door;
   the frame comprising:
   a window frame portion on which a window glass is mounted, the window frame portion being formed in an upper portion of the frame;
   a locking device fixing portion for supportively receiving a locking device therein, the locking device fixing portion being formed in a bottom portion of the frame; and
   a V-shaped stiffening frame portion which is integrally formed as part of the frame, and which extends downwardly from both a bottom left corner and a bottom right corner of the window frame portion to the locking device fixing portion;
   wherein the V-shaped stiffening frame portion protrudes toward the outer panel from an inner side contour of the frame with respect to the vehicle, the V-shaped stiffening frame portion having an outwardly bowed arcuate shape, when viewed in a side view; and
   wherein the V-shaped stiffening frame portion is formed on an inner side of an outer side contour of the frame with respect to the vehicle.

16. The hatchback door structure for a vehicle according to claim 1,
   wherein a length of the V-shaped stiffening frame portion is longer than a length of a coextensive inner side contour of the frame with respect to the vehicle.

17. The hatchback door structure for a vehicle according to claim 9,
   wherein a length of the V-shaped stiffening frame portion is longer than a length of a coextensive inner side contour of the frame with respect to the vehicle.

18. The hatchback door structure for a vehicle according to claim 13,
   wherein a length of the V-shaped stiffening frame portion is longer than a length of a coextensive inner side contour of the frame with respect to the vehicle.

19. The hatchback door structure for a vehicle according to claim 15,
   wherein a length of the V-shaped stiffening frame portion is longer than a length of a coextensive inner side contour of the frame with respect to the vehicle.

20. The hatchback door structure for a vehicle according to claim 16,
   wherein a bottom end of the V-shaped stiffening frame portion, as viewed in cross section, continuously extends to the inner side contour of the frame with respect to the vehicle.

21. The hatchback door structure for a vehicle according to claim 17,
   wherein a bottom end of the V-shaped stiffening frame portion, as viewed in cross section, continuously extends to the inner side contour of the frame with respect to the vehicle.

22. The hatchback door structure for a vehicle according to claim 18,
   wherein a bottom end of the V-shaped stiffening frame portion, as viewed in cross section, continuously extends to the inner side contour of the frame with respect to the vehicle.

23. The hatchback door structure for a vehicle according to claim 19,
   wherein a bottom end of the V-shaped stiffening frame portion, as viewed in cross section, continuously extends to the inner side contour of the frame with respect to the vehicle.

* * * * *